(12) United States Patent
Kim et al.

(10) Patent No.: US 8,187,786 B2
(45) Date of Patent: May 29, 2012

(54) PATTERN FORMING MATERIALS AND PATTERN FORMATION METHOD USING THE MATERIALS

(75) Inventors: Joo-Ho Kim, Yongin-si (KR); Junji Tominaga, Ibaraki (JP); Masashi Kuwahara, Ibaraki (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1236 days.

(21) Appl. No.: 10/531,897

(22) PCT Filed: Oct. 20, 2003

(86) PCT No.: PCT/KR03/02192
§ 371 (c)(1),
(2), (4) Date: May 17, 2006

(87) PCT Pub. No.: WO2004/038502
PCT Pub. Date: May 6, 2004

(65) Prior Publication Data
US 2006/0234168 A1    Oct. 19, 2006

(30) Foreign Application Priority Data
Oct. 23, 2002    (JP) ................................ 2002-308679

(51) Int. Cl.
*G03F 7/00*    (2006.01)
(52) U.S. Cl. ................. 430/270.1; 430/270.11; 430/326
(58) Field of Classification Search ............... 430/270.1, 430/270.11
See application file for complete search history.

(56) References Cited

U.S. PATENT DOCUMENTS

| 5,368,986 | A | * | 11/1994 | Terao et al. | 430/270.12 |
| 5,635,267 | A | * | 6/1997 | Yamada et al. | 428/64.4 |
| 5,858,604 | A | * | 1/1999 | Takeda et al. | 430/162 |
| 6,411,591 | B1 | * | 6/2002 | Moritani et al. | 369/275.2 |

(Continued)

FOREIGN PATENT DOCUMENTS

JP    1987-53886    3/1987

(Continued)

OTHER PUBLICATIONS

Kouchiyama et al., "High Resolution Blue Laser Mastering Using an Inorganic Photoresist," Storage Technology Laboratories, Sony Corporation, The Japanese Journal of Applied Physics, vol. 42 (2003), pp. 769-771. (Received Aug. 9, 2002; accepted for publication Aug. 26, 2002).*

(Continued)

*Primary Examiner* — Cynthia Kelly
*Assistant Examiner* — Connie P Johnson
(74) *Attorney, Agent, or Firm* — NSIP Law

(57) ABSTRACT

A pattern forming materials includes a thermal sensitive material layer formed on a target substrate, a first light-to-heat converting layer formed between the thermal sensitive material layer and the target substrate, and a second light-to-heat converting layer formed on a surface of the thermal sensitive material layer opposite to the first light-to-heat converting layer, the thermal sensitive material layer being interposed between the first and second light-to-heat converting layers. A higher aspect ratio fine pattern can be formed in the thermal sensitive material layer made of photoresist using heat generated in the first and second light-to-heat converting layers formed on both surfaces of the thermal sensitive material layer.

24 Claims, 14 Drawing Sheets

U.S. PATENT DOCUMENTS

| | | | |
|---|---|---|---|
| 2002/0122918 A1 * | 9/2002 | Dentinger et al. | 428/138 |
| 2003/0002428 A1 * | 1/2003 | Cheong et al. | 369/275.2 |
| 2003/0143407 A1 * | 7/2003 | Yamasaki et al. | 428/447 |

FOREIGN PATENT DOCUMENTS

| | | |
|---|---|---|
| JP | 1993-342629 | 12/1993 |
| JP | 1999-203724 | 7/1999 |
| JP | 2000-215510 | 8/2000 |
| JP | 2000-343826 | 12/2000 |
| JP | 2002-86945 | 3/2002 |
| WO | WO 98/47142 | 10/1998 |

OTHER PUBLICATIONS

Kuwahara et al., "Thermal Lithography for 0.11 μm Pattern Fabrication," *Microelectronic Engineering*, 61-62 (2002) 415-421.

Office Action issued on May 22, 2007 by the Japanese Patent Office for Japanese Patent Application No. 2002-308679.

Office Action issued on Sep. 26, 2007 by the Indonesian Intellectual Property Office for Indonesian Patent Application No. W-00200501342.

* cited by examiner

PATTERN FORMING MATERIALS AND PATTERN FORMATION METHOD USING THE MATERIALS

CROSS-REFERENCE TO RELATED APPLICATIONS

This application claims the benefit of PCT International Application No. PCT/KR2003/2192 filed on Oct. 20, 2003 in the Korean Intellectual Property Office, the disclosure of which is incorporated herein by reference. Additionally, this application is based on Japanese Patent Application No. 2002-308679, filed on Oct. 23, 2002, in the Japanese Intellectual Property Office.

BACKGROUND OF THE INVENTION

1. Field of the Invention

The present invention relates to micromachining of a substrate, and more particularly, to a material for use in forming a fine pattern on a substrate and a method of forming a fine pattern using the material.

2. Description of the Related Art

Intensive research on fine patterning methods, such as photolithography, using vacuum ultraviolet rays (VUV) or X-rays, which are applied in the manufacture of semiconductor integrated circuits or electronic/electrical parts, including optical discs, has been conducted. Fine pattern structures with a line width of 0.1 μm can be realized in current situations based on such patterning techniques, and their commercialization is expected in a few years.

A conventional method of forming a resist pattern in the manufacture of electronic/electrical parts involves irradiating with activation light a photoresist layer through a predetermined mask pattern and developing the photoresist layer. Accordingly, the dimensions of the resist pattern are limited to be slightly smaller than the wavelength of the activation light used, due to diffraction of the activation light. The diffraction limit depends on the wavelength of light and the numerical aperture of a lens used. Shorter light wavelength and greater numerical aperture of a lens are more effective in reducing the diffraction limit. However, since increasing the numerical aperture of the lens has limitations, there are more trends toward using a shorter light wavelength to form smaller resist patterns.

New exposure technology using deep UV, laser light, or soft X-ray has been researched. Currently, it is possible to form a fine pattern of about 150 nm in size using a KrF eximer laser or an ArF eximer laser. However, there are needs for improvements in these techniques, for example, in the development of high-performance light sources, or property improvements of optical materials or resist materials. Furthermore, there are also needs for technology improvements that allows for the use of smaller light sources or optical systems and saves energy.

Electron beam lithography permits much finer pattern processing in nanometer pattern dimensions compared to photolithography. However, electron beam lithography requires an additional vacuum enclosure, a large electrode, and a high power source for electron acceleration or deflection. Also, the use of a high accelerating voltage of tens of kilovolts raises safety concerns.

In addition, using smaller wavelength of light or electron beam to form fine patterns in the above-described techniques is costly. To overcome such defects in the conventional fine pattern formation methods, various methods of forming fine patterns have been suggested. For example, Japanese Patent Application No. hei 8-249493 discloses a pattern formation method in which the crystalline state of chalcogenide is thermally changed by laser light irradiation. This fine patterning method is based on variation in etch rate between different crystalline states and ensures patterning to be smaller than the diffraction limit. However, the variation in etch rate depending on crystalline states is not large enough, and the uneven chalcogenide layer leads to varying etch rates even for the same crystalline state. Moreover, a chalcogenide layer is etched first at an intercrystalline domain so that a quality fine pattern is not guaranteed. In addition, chalcogenide, which is an essential material of the disclosure, cannot be applied to form a fine pattern for semiconductors. Other problems arise from the change of the chalcogenide.

A pattern forming material which thermally changes by activation light irradiation and a patterning method using the material are suggested (Microelectronic Engineering 61-62, 2002, p. 415-421). In this disclosure, a light-to-heat converting material layer made of $Ge_2Sb_2Te_5$ is interposed between a target substrate and a photoresist layer to be patterned and is subjected to activation light irradiation to generate heat. The heat generated in the $Ge_2Sb_2Te_5$ layer is transferred to the overlying photoresist layer inducing chemical reactions and forming a fine pattern therein. A pattern of 100 nm can be formed with this method. In addition, since a low cost semiconductor laser is used as an activation light source and energy consumption is small, compared to techniques which require costly high-performance light sources, such as a KrF eximer laser, or ArF eximer laser, or electron beams, the disclosed method is regarded to be very economical and offers higher processing precision and finer pattern processing ability compared to the method using chalcogenide.

However, the above resist patterning method using the light-to-heat converting material layer has the following limitations. The amount of heat transferred from the light-to-heat converting layer to the photoresist layer is not enough to form a desired fine pattern. The maximum pattern height that can be obtained with this method is limited to 30 nm when the width of a pattern is designed at 100 nm. In other words, this method cannot be applied to form a high aspect ratio pattern on a substrate. When the intensity of laser light radiated is increased to generate a larger amount of heat or for a higher processing rate or greater pattern height, the photoresist layer undesirably evaporates and disappears.

SUMMARY OF THE INVENTION

According to an aspect of the present invention, there is provided new pattern forming materials useful for a high aspect ratio fine pattern and a pattern formation method using the materials.

According to another aspect of the present invention, there is provided a method of efficiently forming a high aspect ratio fine pattern in a thermal sensitive material layer formed on a target substrate using heat generated at first and second light-to-heat converting layers formed on both surfaces of the thermal sensitive material layer, via activation light irradiation.

According to another aspect of the present invention, there are provided pattern forming materials including: a thermal sensitive material layer formed on a target substrate; a first light-to-heat converting layer formed between the thermal sensitive material layer and the target substrate; and a second light-to-heat converting layer formed on a surface of the thermal sensitive material layer opposite to the first light-to-heat converting layer, the thermal sensitive material layer being interposed between the first and second light-to-heat converting layers.

In accordance with another aspect of the present invention, there is provided a method of forming fine patterns using the above pattern forming materials.

According to an aspect of the present invention, since the photo and/or thermal sensitive material layer is interposed between the first and second light-to-heat converting layers, both surfaces of the photo and/or thermal sensitive material layer are efficiently heated by activation light irradiation without evaporation or deformation thereof. A resulting fine pattern has a hole shape and a higher aspect ratio.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
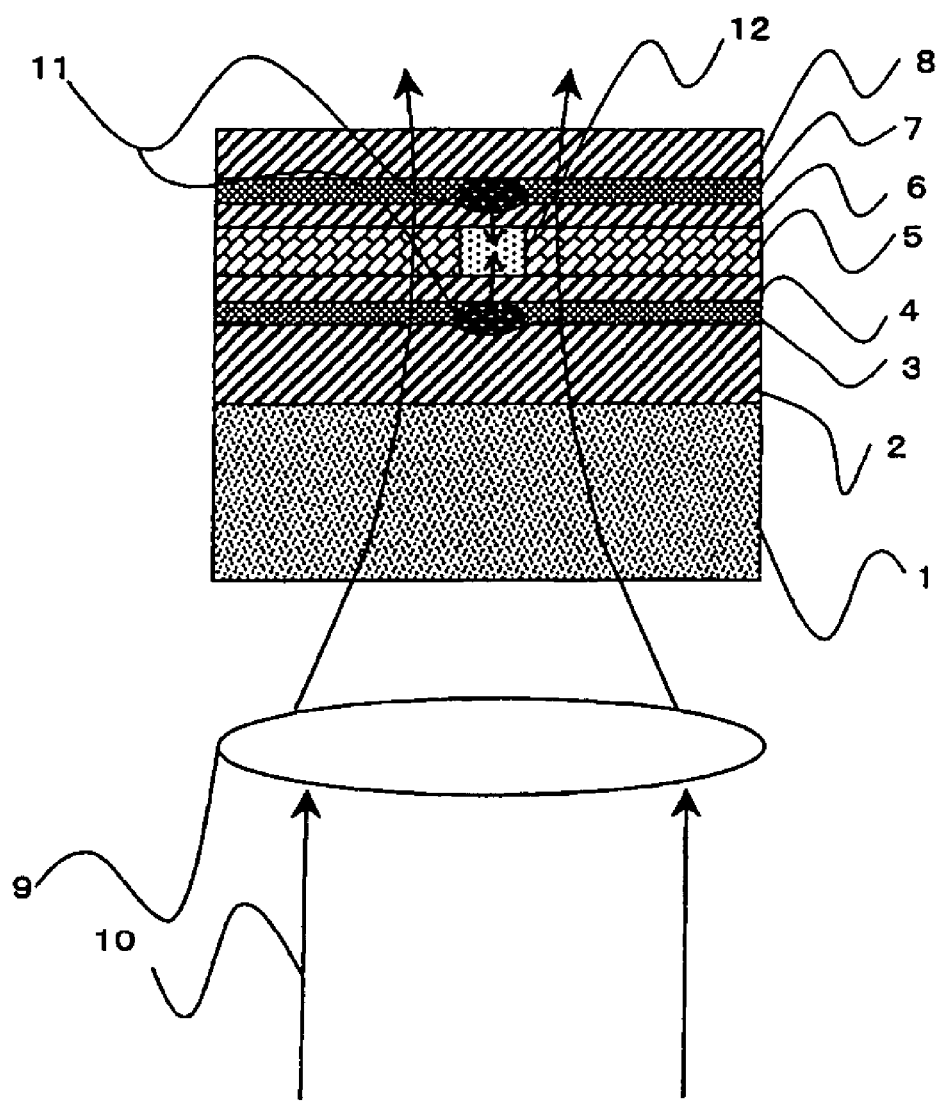
FIG. 1 is a sectional view illustrating an exemplary structure of pattern forming materials and the principle of patterning using the pattern forming materials according to an embodiment of the present invention.

Reference will now be made in detail to the present embodiments of the present invention, examples of which are illustrated in, the accompanying drawings, wherein like reference numerals refer to the like elements throughout. The embodiments are described below in order to explain the present invention by referring to the figures.

<Embodiment 1>

FIG. 1 illustrates an exemplary structure of pattern forming materials according to an embodiment of the present invention and the principle of forming a fine pattern using the pattern forming materials. The pattern forming materials of FIG. 1 include a first light-to-heat converting layer 3, a first thermal buffer layer 4, a photo and/or thermal sensitive material layer 5, a second thermal buffer layer 6, a second light-to-heat converting layer 7, and a cap layer 8, which are sequentially stacked upon one another, with a substrate protective layer 2 between the first light-to-heat converting layer 3 and a target substrate 1. When activation light 10 is radiated onto the pattern forming materials having the above structure via a lens 9, the energy of the activation light 10 is converted into heat 11 by the function of the first and second light-to-heat converting layers 3 and 7. The heat 11 is transferred via the first and second thermal buffer layers 4 and 6 to heat a pattern portion 12 of the photo and/or thermal sensitive material layer 5 and induce a chemical reaction therein. Although the activation light 10 is illustrated as being radiated through the target substrate 1, the activation light 10 may be radiated in a direction opposite to the target substrate 1 if necessary. The thickness of each layer is determined to be in a range of 2-200 nm. However, each layer may be formed to be thinner or thicker than the above range depending on a desired pattern size or the material composing the photo and/or thermal sensitive material layer 5.

The activation light 10 is not fully absorbed by the first light-to-heat converting layer 3, and a large portion of the activation light 10 is transmitted through the first light-to-heat converting layer 3. The transmitted portion of the activation light 10 is absorbed and converted into heat by the second light-to-heat converting layer 7. Compared with the conventional material which uses only one light-to-heat converting layer, the material of the present invention uses at least two light-to-heat converting layers and thus the activation light 10 can be more efficiently converted into heat even at a low output power. Therefore, a conventional problem that the photo and/or thermal sensitive material layer evaporates due to an excess increase in the output power of the activation light does not arise. As such, the activation light 10 is absorbed and converted into heat by the first and second light-to-heat converting layers 3 and 7. The heat generated by the activation light 10 is transmitted to the photo and/or thermal sensitive material layer 5 inducing a chemical reaction in the pattern portion 12. Subsequently, a reaction domain or a non-reaction domain is etched away to form a desired pattern.

Figure 2:
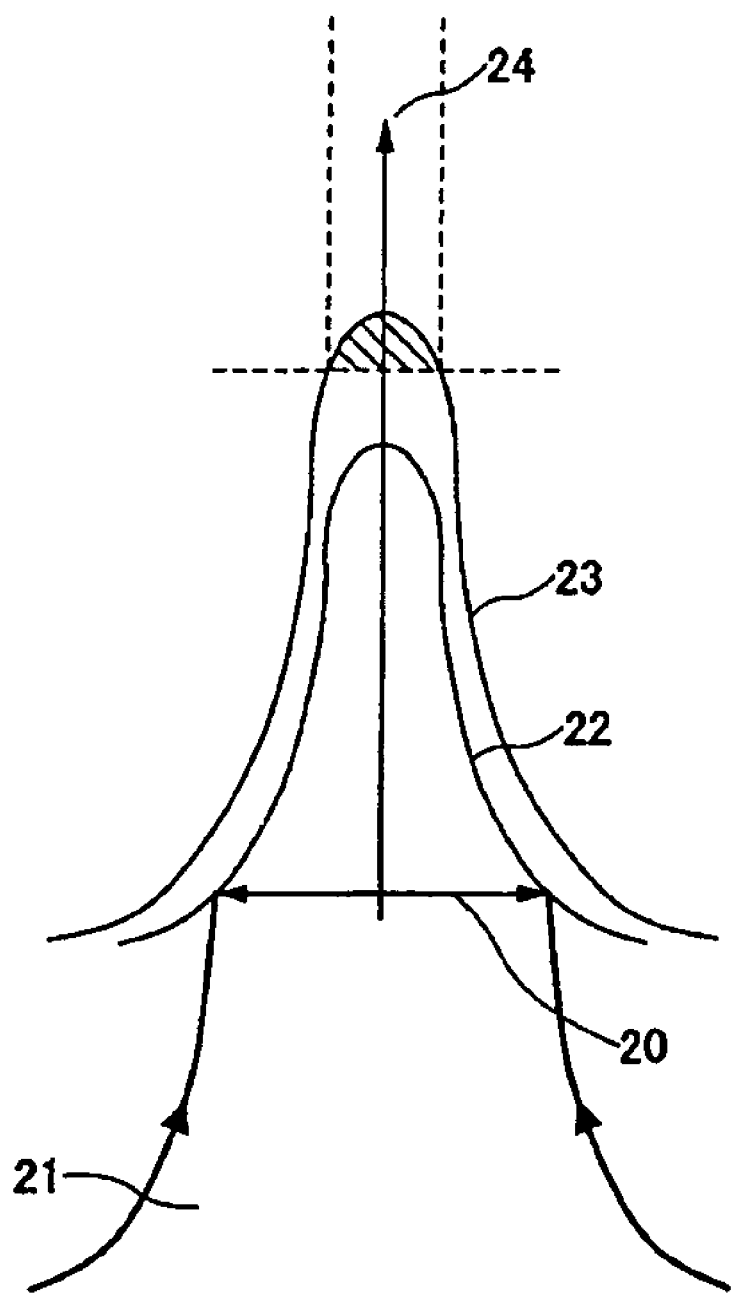
FIG. 2 is a graph of light intensity and temperature distributions when activation light is incident on a light-to-heat converting layer.

The principle enabling the formation of patterns finer than the diffraction limit of the activation light is illustrated in FIG. 2.

FIG. 2 is a graph of light intensity and temperature distributions when activation light is incident on a light-to-heat converting layer. Referring to FIG. 2, activation light 21 incident on the light-to-heat converting layer with a spot diameter 20 has a Gaussian intensity distribution 22 where the intensity is peak at the center of the spot. The temperature of the light-to-heat converting layer has a Gaussian distribution. A region 24 is an effective region of the photo and/or thermal sensitive layer 5 (refer to FIG. 1) where chemical reaction is induced due to a high temperature and is narrower than the spot diameter 20. The Gaussian temperature distribution of the light-to-heat converting layers 3 and 7 that renders a reaction region narrower than the spot diameter 20 is important. Based on such a temperature distribution of the first and second light-to-heat converting layers 3 and 7 of FIG. 1, the intensity of activation light or activation light irradiation duration may be further varied to control the heat generation in the first and second light-to-heat converting layers 3 and 7. As a result, thermal chemical reaction is induced only in a small region of the photo and/or thermal sensitive material layer that is irradiated by the center of the spot of the activation light, thereby enabling the formation of patterns finer than the diffraction limit of the activation light In a conventional structure including only one light-to-heat converting layer beneath a photo and/or thermal sensitive material layer, a limited amount of heat is transferred to the photo and/or thermal sensitive material layer so that thermal reaction therein is not sufficient to form a high aspect ratio fine pattern. However, according to an embodiment of the present invention, since the photo and/or thermal sensitive material layer 5 is inserted between the first and second light-to-heat converting layers 3 and 7, both surfaces of the photo and/or thermal sensitive material layer 5 are heated with higher efficiency, thereby enabling a high aspect ratio fine pattern to be formed.

The temperature of the first and second light-to-heat converting layers 3 and 4 may rise above hundreds of degrees Celsius. To prevent problems arising from such a temperature rise, the substrate protective layer 2 is formed on the substrate 1.

In particular, to prevent damage of the target substrate 1 by the heat generated in the first light-to-heat converting layer 3, the substrate protective layer 2 is formed on the surface of the target substrate 1. Suitable materials for the substrate protective layer 2 include inorganic compounds, such as $ZnS.SiO_2$, and organic compounds, such as polyimide. The thickness of the substrate protective layer 2 may be, but is not limited to, in a range of 50-500 nm, depending on the wavelength of activation light used and the material properties of the substrate protective layer 2. When the target substrate 1 is thermally resistant, the substrate protective layer 2 is unnecessary.

Due to a steep temperature rise in the material, caused by the heat generated in the first and second light-to-heat converting layers 3 and 7, the photo and/or thermal sensitive material layer 5 may be abruptly deformed, evaporate, or swell. To prevent this, the first and second thermal buffer layers 4 and 6 are formed between the photo and/or thermal sensitive material layer 5 and the respective first and second light-to-heat converting layers 3 and 7. Materials for the first and second thermal buffer layers 4 and 6 may be the same as materials for the substrate protective layer 2. The thicknesses of the first and second thermal buffer layers 4 and 6 are in a range of 5-100 nm, and preferably, 10-50 nm. The thickness of the first and second thermal buffer layers 4 and 6 influences heat diffusibility and pattern shape. It is preferable, but not necessary, that the thickness of the first and second thermal buffer layers 4 and 6 be smaller than a desired pattern size. When the photo and/or thermal sensitive material layer 5 is thermally resistant or when certain activation light irradiation conditions prevail, the first and second thermal buffer layers 4 and 6 may not be necessary. Alternatively, any one of the first and second thermal buffer layers 4 and 6 may be formed if required.

In order to prevent abrupt deformation, evaporation, or swelling of the second light-to-heat converting layer 7 as well as the photo and/or thermal sensitive material layer 5, the cap layer 8 may be formed on the second light-to-heat converting layer 7. Suitable materials for the cap layer 8 include transparent plastics, transparent glass, dielectric materials, etc. The thickness of the cap layer 8 may be, but is not limited to, in a range of 5-200 nm, and preferably, 10-50 nm. The cap layer 8 may not be necessary when the photo and/or thermal sensitive material layer 5 is thermally resistant or when certain activation light irradiation conditions prevail.

Materials for the target substrate 1 which are compatible with pattern forming materials according to an embodiment of the present invention having the above-described structure include common materials for substrates used to manufacture electronic/electrical parts by general lithography. The target substrate 1 may be an inorganic substrate made of, for example, silicon, tantalum, aluminum, or gallium-arsenic; a glass substrate; or a plastic substrate made of, for example, polypropylene, acrylic resins, polycarbonate, polystyrene resins, or vinylchloride resins. Alternatively, an inorganic substrate made of aluminum, tantalum, silica, etc., or a glass substrate with an aluminum or tantalum layer deposited thereon or with a light curing resin layer coated thereon may be used.

Any material which changes properties due to heating and/or activation light irradiation and which allows a sharp pattern to appear through development processes can be used for the photo and/or thermal sensitive material layer 5. Examples of such a material include positive type and negative type photoresists which have been commonly used so far to manufacture electronic/electrical parts by lithography. In addition, electron beam resist that thermally changes can be used.

Any material capable of absorbing light and converting it into heat can be used for the first and second light-to-heat converting layers 3 and 7. Examples of such a material include: Ge—Sb—Te alloys, including $Ge_2Sb_2Te_5$ used for a recording layer of DVD-RAMs; Sb; Ag—In—Sb—Te alloys; Ag—In—Sb—Te—V alloys; lithium niobate; methyinitro aniline, etc.

In the pattern forming materials according to an embodiment of the present invention, the thickness of the photo and/or thermal sensitive material layer 5 is in a range of 10-1000 nm, and preferably, 50-200 nm. The thicknesses of the first and second light-to-heat converting layers 3 and 7 are in a range of 5-300 nm, and preferably, 10-150 nm. The thickness of the first and second light-to-heat converting layers 3 and 7 is not limited to the above range and is varied depending on the wavelength of activation light used and the material composing the first and second light-to-heat converting layers 3 and 7.

A method of forming a fine pattern using the above pattern forming materials according to another embodiment of the present invention will be described with reference to the appended drawings.

<Embodiment 2>

FIGS. 3A, 3B, 4A, and 4B are sectional views illustrating a method of forming a fine pattern according to an embodiment of the present invention. In FIGS. 3A, 3B, 4A, and 4B, elements that appeared in previous drawings are designated by the same reference numerals.

Figure 3A:
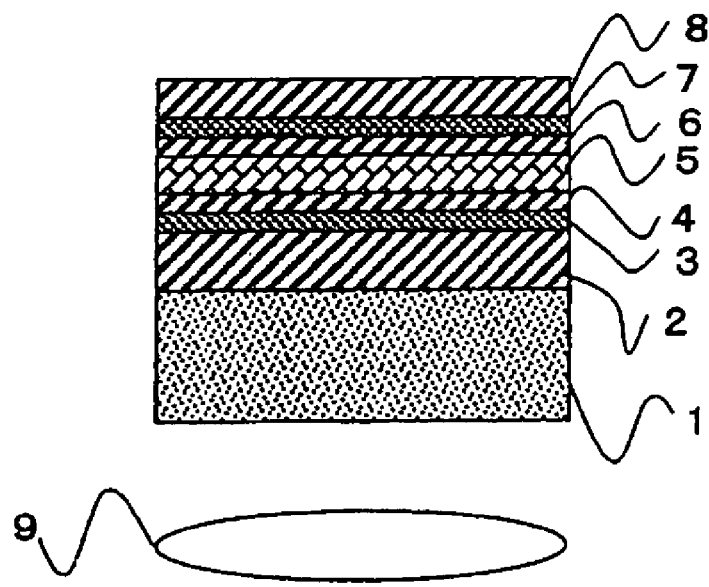
FIGS. 3A, 3B, 4A and 4B are sectional views illustrating a method of forming a fine pattern according to another embodiment of the present invention.

Referring to FIG. 3A, pattern forming materials including the first light-to-heat converting layer 3, the first thermal buffer layer 4, the photo and/or thermal sensitive material layer 5, the second thermal buffer layer 6, the second light-to-heat converting layer 7, and the cap layer 8 are formed on the target substrate 1, with the substrate protective layer 2 between the first light-to-heat converting layer 3 and the target substrate 1. The photo and/or thermal sensitive material layer 5 is made of a positive type photoresist. The lens 9 which converges activation light is installed below the target substrate 1.

Figure 3B:
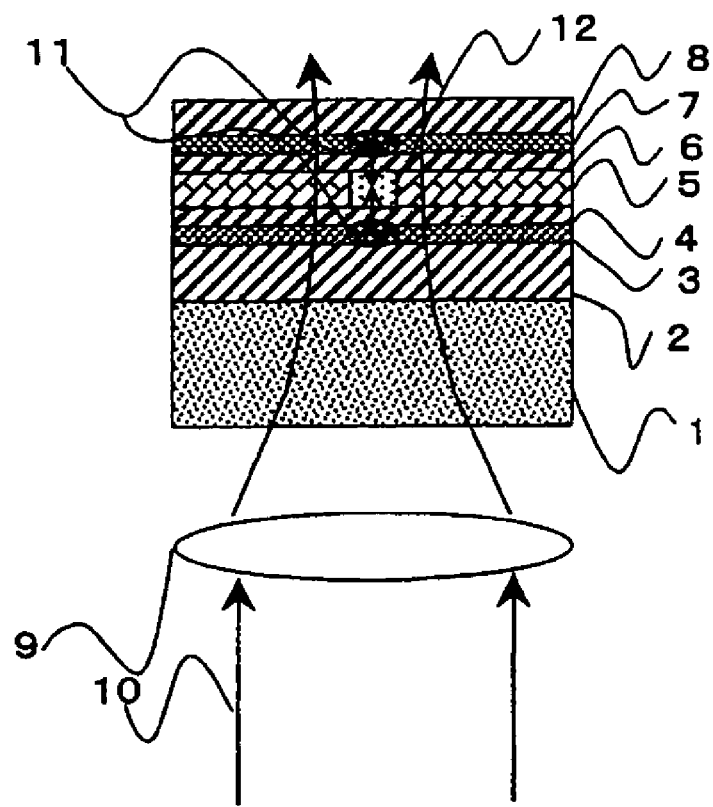

Referring to FIG. 3B, the activation light 10, for example, a laser beam, is radiated to generate heat in the first and second light-to-heat converting layers 3 and 7 and selectively heat a portion of the photo and/or thermal sensitive material layer 5 made of a positive type photoresist to form the pattern portion 12, which is no longer photosensitive due to the exposure to heat. Since the photo and/or thermal sensitive material layer 5 is interposed between the first and second light-to-heat converting layers 3 and 7, both surfaces of the photo and/or thermal sensitive layer 5 are efficiently heated, thereby enabling a fine high aspect ratio pattern to be formed.

Figure 4A:
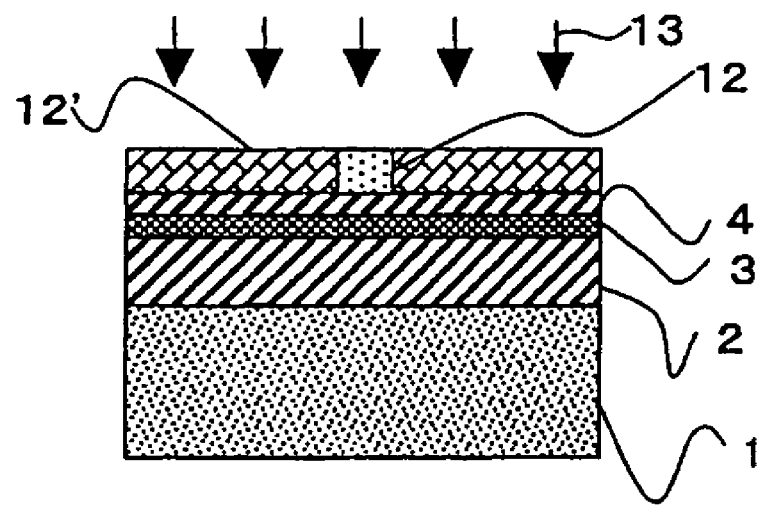

Referring to FIG. 4A, after the thermal buffer layer 6, the second light-to-heat converting layer 7, and the cap layer 8 are removed, activation light 13, for example, blue light, is radiated over the entire exposed surface of the photo and/or thermal sensitive layer 5. As a result, a non-pattern portion 12' around the pattern portion 12 is changed to be soluble in a developing solution through a reaction with the blue light 13. The same result can be obtained when the blue light 13 is radiated before the second thermal buffer layer 6, the second light-to-heat converting layer 7, and the cap layer 8 are removed.

Next, a development process is performed to remove the non-pattern portion 12' so that only the pattern portion 12 made of resist remains.

The second thermal buffer layer 6, the second light-to-heat converting layer 7, and the cap layer 8 deposited on the photo and thermal sensitive material layer 5 can be removed by dry etching or wet etching. Suitable dry etching methods include reactive ion etching (RIE), sputtering etching, etc. HF, KOH, HCl, and other kinds of etchant can be used for wet etching. However, the method and etchants which can be used to remove the above layers are not limited to the above.

Various kinds of activation light which are commonly used for fine lithography can be selectively used as a light source in the present invention. In addition, the activation light 10 used in the process of FIG. 3B and the activation light 13 used in the process of FIG. 4A may have different wavelengths or the same wavelength. A suitable activation light source is chosen depending on the properties of the photo and/or thermal sensitive material used. Suitable activation light sources include visible light, deep UV, I-ray, g-ray, KrF eximer laser, ArF eximer layer, etc.

<Embodiment 3>

FIGS. 5A, 5B, 6A, and 6B are sectional views illustrating a method of forming a fine pattern according to another embodiment of the present invention. In FIGS. 5A, 5B, 6A, and 6B, elements that appeared in previous drawings are designated by the same reference numerals.

Figure 5A:
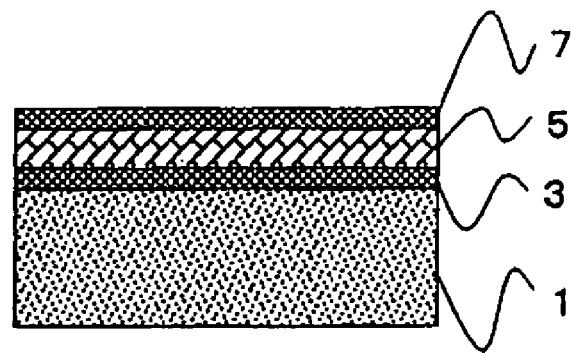
FIGS. 5A, 5B, 6A and 6B are sectional views illustrating a method of forming a fine pattern according to another embodiment of the present invention.
Figure 5A:

Referring to FIG. 5A, pattern forming materials including the first light-to-heat converting layer 3, the photo and/or thermal sensitive material layer 5, and the second light-to-heat converting layer 7 are formed on the target substrate 1. In other words, the substrate protective layer 2, the first thermal buffer layer 4, the second thermal buffer layer 6, and the cap layer 8, which are formed in the previous embodiment, may be not formed. Such thermal protective layers and cap layer may be not formed depending on the thermal resistance of the target substrate 1 and the photo and/or thermal sensitive material layer 5 and activation light irradiation conditions, for example, the intensity of activation light.

Figure 5B:
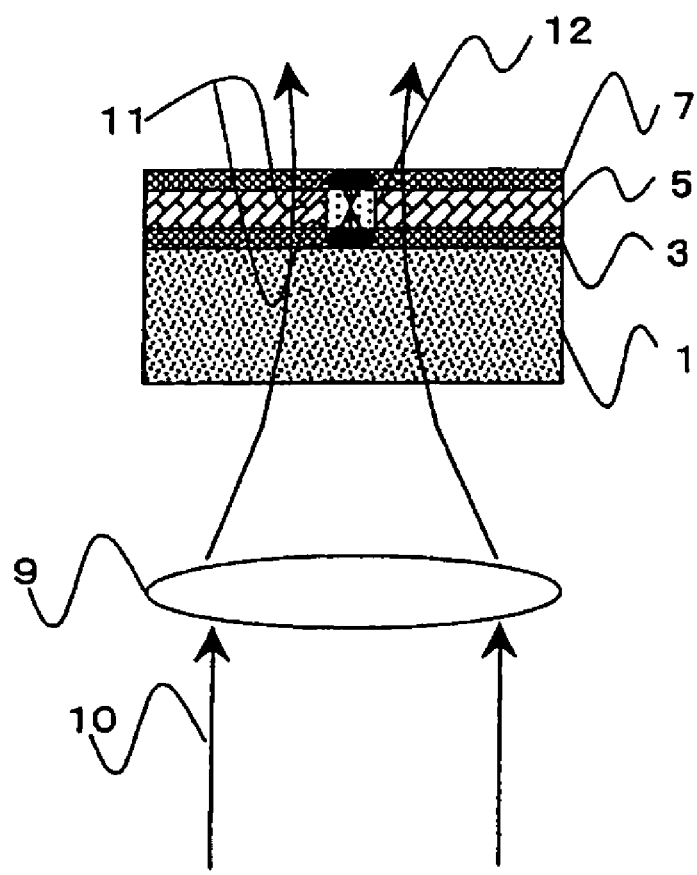

Referring to FIG. 5B, the activation light 10, for example, a laser beam, radiates the first and second light-to-heat converting layers 3 and 7 and selectively heats a portion of the photo and/or thermal sensitive material layer 5 made of a positive type photoresist forming the pattern portion 12, which is no longer photosensitive due to the exposure to heat. Since the photo and/or thermal sensitive material layer 5 is interposed between the first and second light-to-heat converting layers 3 and 7, both surfaces of the photo and/or thermal sensitive layer 5 are efficiently heated, thereby enabling the formation of a fine high aspect ratio pattern.

Figure 6A:
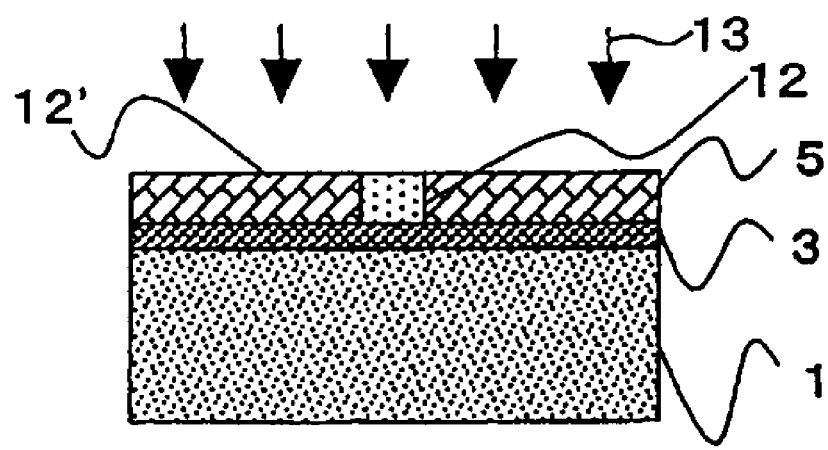
Figure 6B:
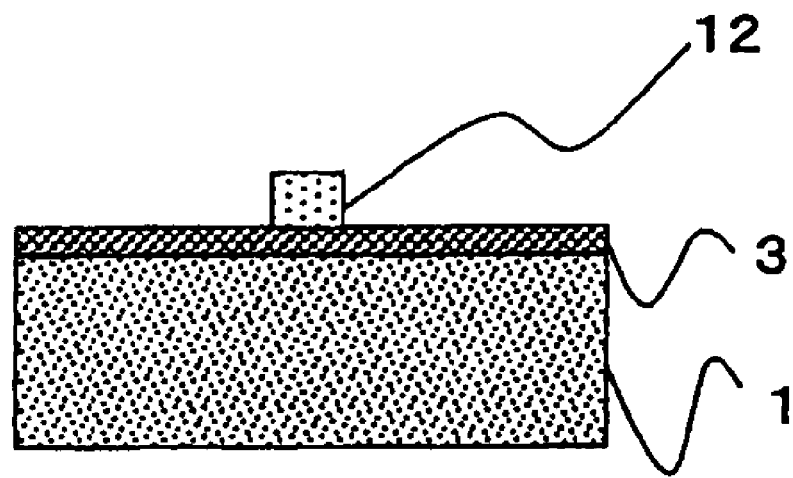

Referring to FIG. 6A, after the second light-to-heat converting layer 7 is removed, activation light 13, for example, blue light, is radiated over the entire exposed surface of the photo and/or thermal sensitive layer 5. As a result, a non-pattern portion 12' around the pattern portion 12 is changed to be soluble in a developing solution through a reaction with the blue light 13. The same result can be obtained when the blue light 13 is radiated before the second light-to-heat converting layer 7 is removed.

Next, a development process is performed to remove the non-pattern portion 12' so that only the pattern portion 12 made of resist remains.

<Embodiment 4>

FIGS. 7A, 7B, 8A, and 8B are sectional views illustrating a method of forming a fine pattern according to another embodiment of the present invention. In FIGS. 7A, 7B, 8A, and 8B, elements that appeared in previous drawings are designated by the same reference numerals.

Figure 4B:
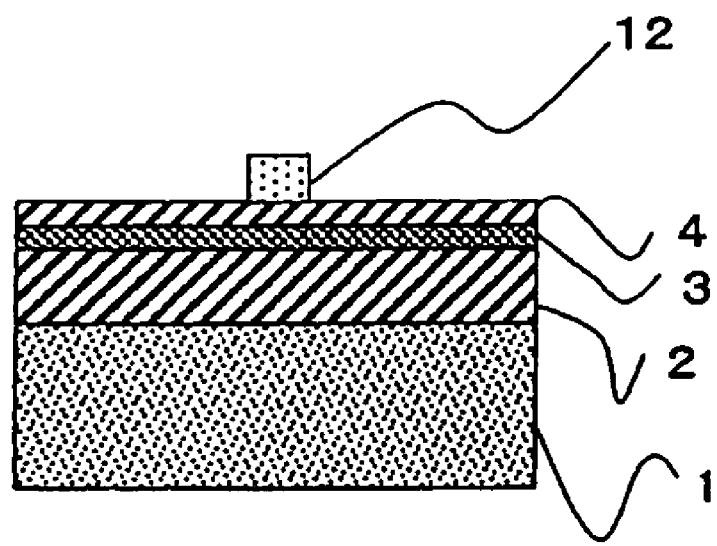
Figure 7A:
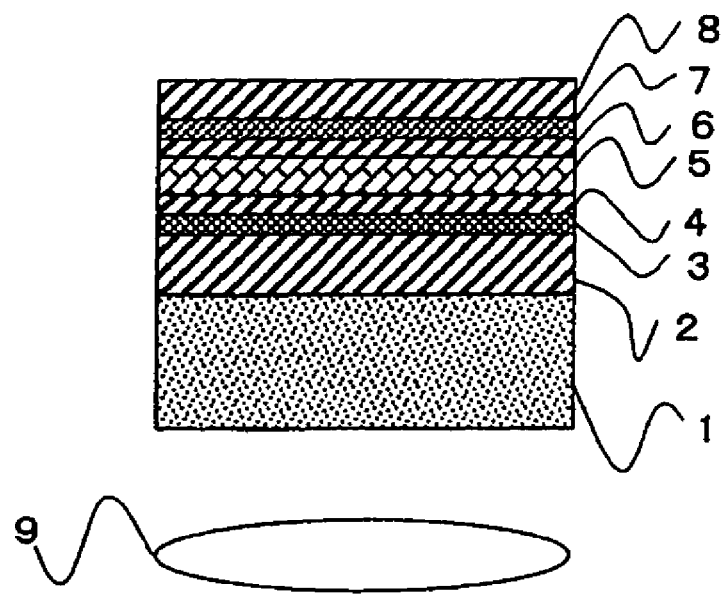
FIGS. 7A, 7B, 8A and 8B are sectional views illustrating a method of forming a fine pattern according to another embodiment of the present invention.
Figure 7B:
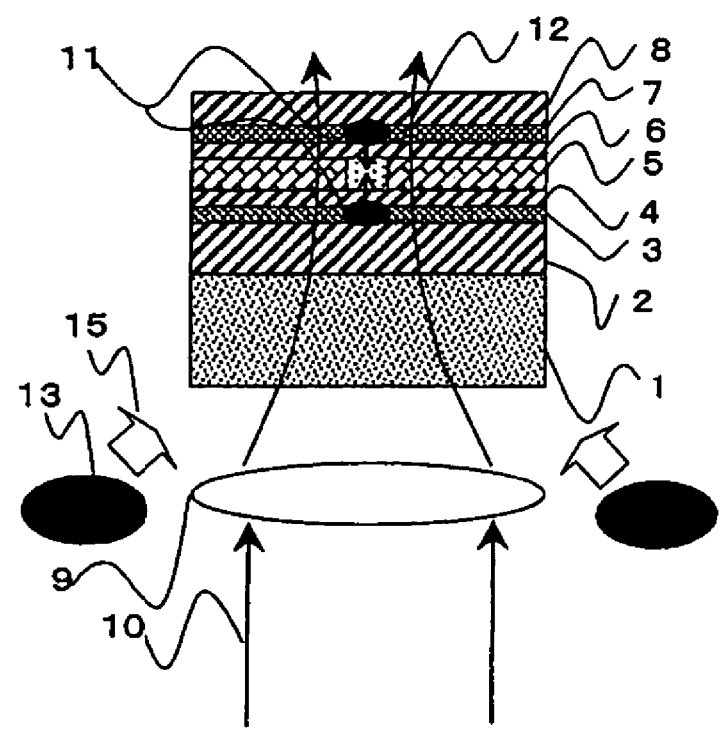
Figure 8A:
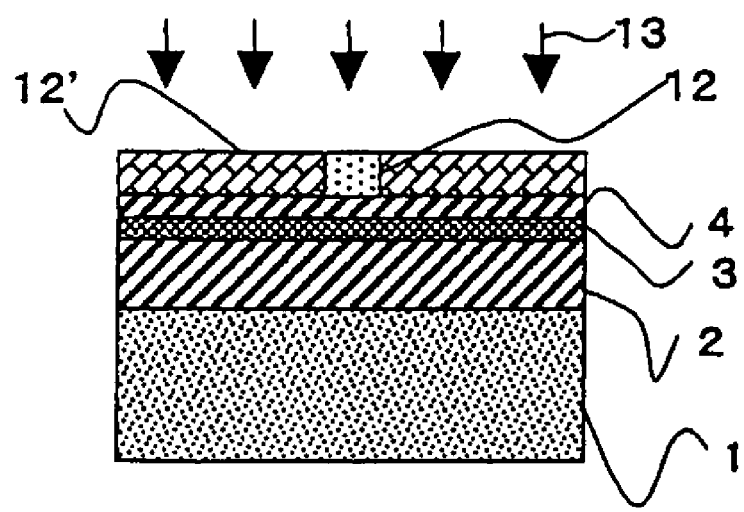
Figure 8B:
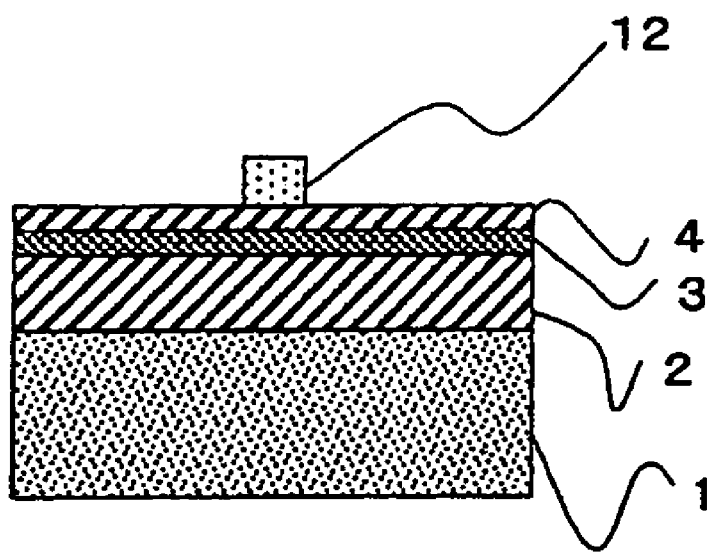

The processes illustrated in FIGS. 7A, 8A, and 8B are the same as the processes illustrated in FIGS. 3A, 4A, and 4B of the second embodiment described above, and thus descriptions thereon will be not repeated here.

Figure 10A:
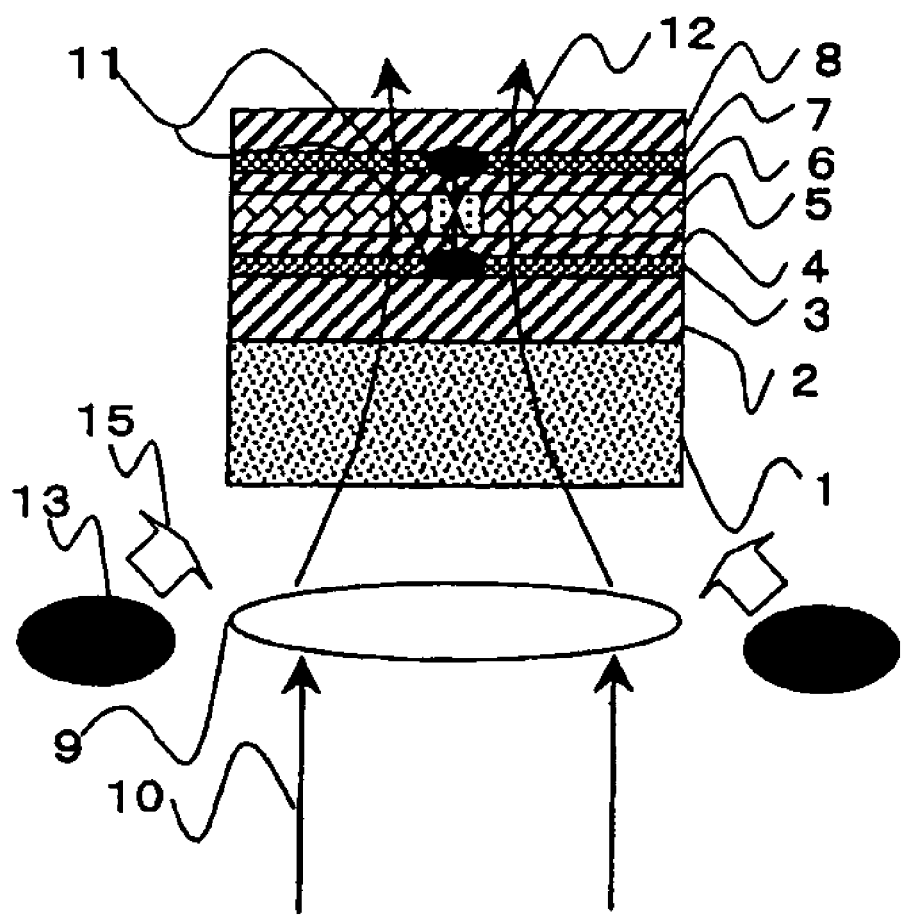

Referring to FIG. 10A, lamp heaters 13 which emit activation light 15 having a long wavelength heat the target substrate 1 and are disposed near the lens 9. Since the photo and/or thermal sensitive material layer 5 is also heated by the additional lamp heaters 13, a larger amount of heat is generated in the first and second light-to-heat converting layers 3 and 7, and a thermal reaction in the photo and/or thermal sensitive material layer 5 is facilitated. Accordingly, a smaller amount of activation light 10 can be radiated.

Any heating device can be used as the lamp heaters 13. For example, an electrical heater, such as a resistor heater, may be installed on a support (not shown) of the target substrate 1.

<Embodiment 5>

FIGS. 9A, 9B, 10A, 10B and 10C are sectional views illustrating a method of forming a fine pattern according to another embodiment of the present invention. In FIGS. 9A, 9B, 10A, 10B and 10C, elements that appeared in previous drawings are designated by the same reference numerals.

Figure 9A:
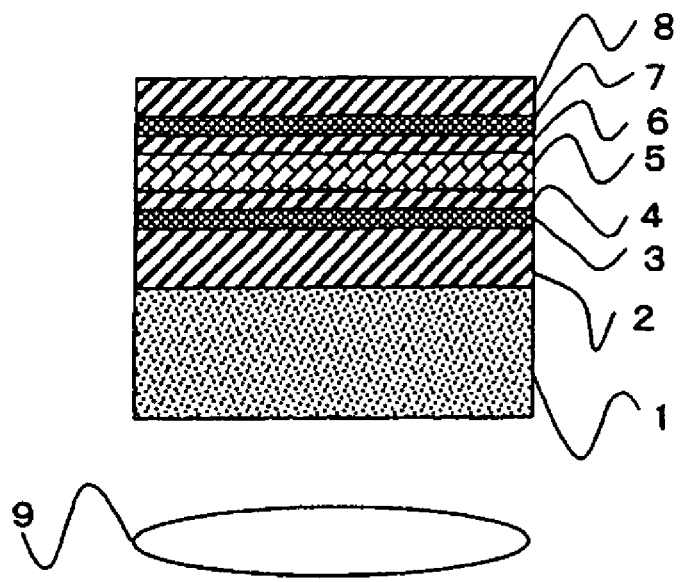
FIGS. 9A, 9B, 10A, 10B and 10C are sectional views illustrating a method of forming a fine pattern according to another embodiment of the present invention.
Figure 9B:
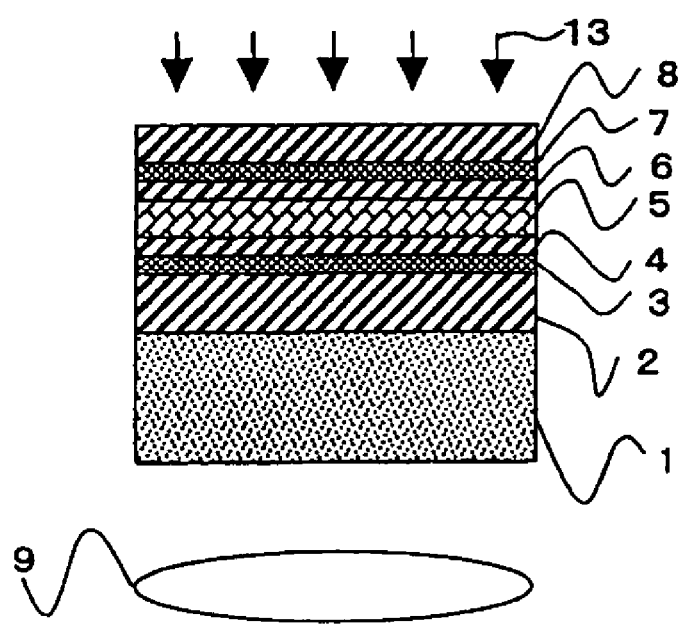

The structure of pattern forming materials shown in FIG. 9A is the same as the structure illustrated in FIG. 3A.

After the structure of the pattern forming materials has been formed, as illustrated in FIG. 9A, the activation light 13 is radiated onto the structure of the pattern forming materials to make the entire photo and/or thermal sensitive material layer 5 soluble in a developing solution. Alternatively, the activation light 13 may be radiated before the second thermal buffer layer 6, the second light-to-heat converting layer 7, and the cap layer 8 are formed.

Next, referring to FIG. 10A, the activation light 10, for example, a laser beam, is radiated to generate heat 11 in the first and second light-to-heat converting layers 3 and 7 and selectively heat a portion of the photo and/or thermal sensitive material layer 5 made of a positive type photoresist to form the pattern portion 12, which is rendered insoluble in a developing solution. In particular, when the activation light 10 is radiated as illustrated in FIG. 10A, protons ($H^+$) are generated in the photo and/or thermal sensitive material layer 5 and catalyze a cross-linking reaction of the positive type resist composing the photo and/or thermal sensitive material layer 5 when heated. As a result, the positive type photoresist is changed to be insoluble in a developing solution. Since the photo and/or thermal sensitive material layer 5 is interposed between the first and second light-to-heat converting layers 3 and 7, both surfaces of the photo and/or thermal sensitive layer 5 are efficiently heated, thereby enabling a fine high aspect ratio pattern to be formed.

Figure 10B:
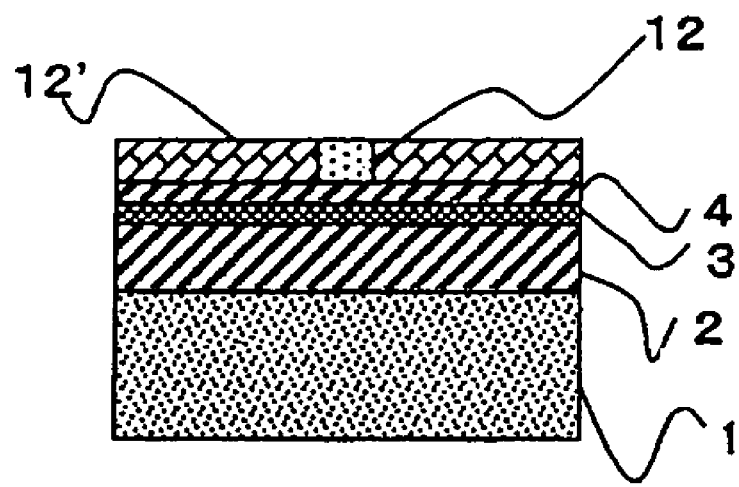

Next, referring to FIG. 10B, the second thermal buffer layer 6, the second light-to-heat converting layer 7, and the cap layer 8 are removed.

Figure 10C:
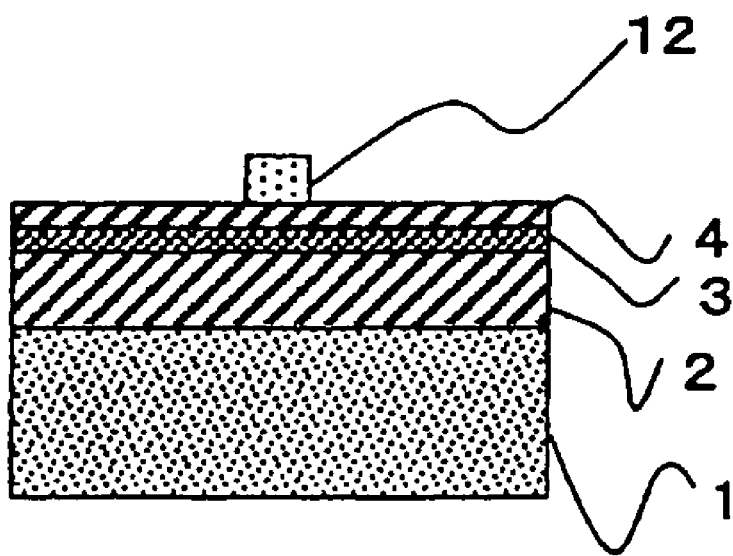

Next, referring to FIG. 10C, a developing process is performed to remove the non-pattern portion 12' so that only the pattern portion 12 made of resist remains as a fine pattern.

<Embodiment 6>

Although the above-described embodiments of the present invention use a positive type photoresist, the same patterning can be performed with a negative type photoresist. An embodiment using a negative type photoresist will be described with reference to FIGS. 11A, 11B, 12A, and 12B. In FIGS. 11A, 11B, 12A, and 12B, elements that appeared in previous drawings are designated by the same reference numerals.

Figure 11A:
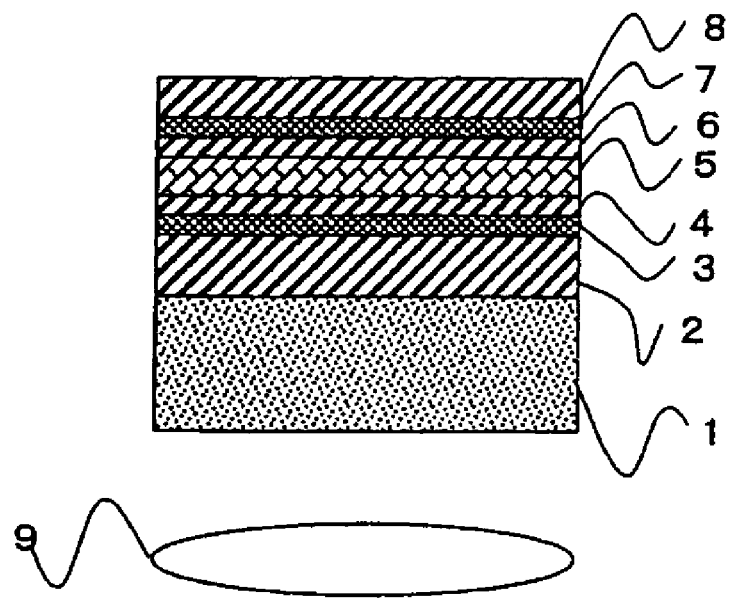
FIGS. 11A, 11B, 12A and 12B are sectional views illustrating a method of forming a fine pattern according to another embodiment of the present invention.

Referring to FIG. 11A, a structure of pattern forming materials, which is the same as the structure of the pattern forming materials illustrated in FIG. 3A, except that a negative type photoresist is used for the photo and/or thermal sensitive material layer 5, is formed.

Figure 11B:
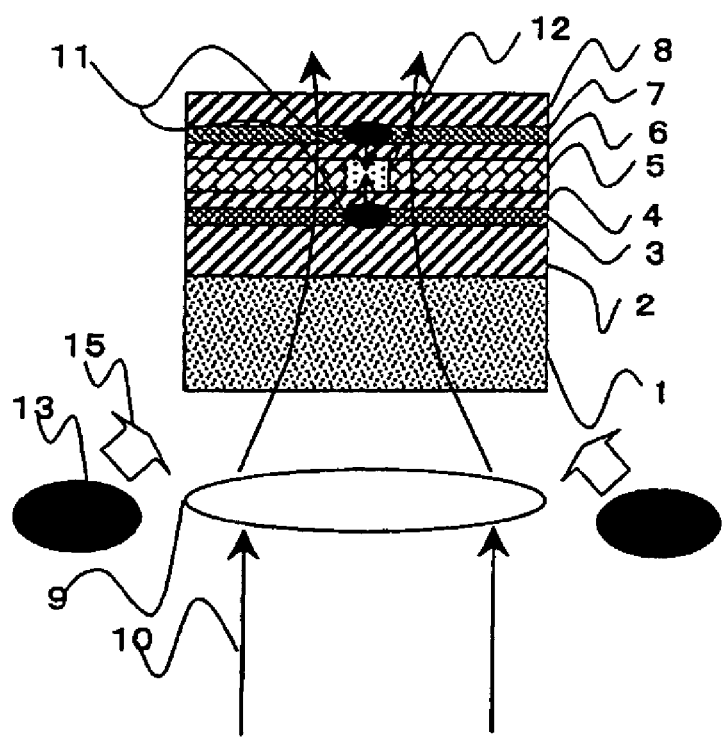

Next, referring to FIG. 11B, the activation light 10, for example, radiates a laser beam generating heat 11 in the first and second light-to-heat converting layers 3 and 7 and selectively heats a portion of the photo and/or thermal sensitive material layer 5 made of a negative type photoresist forming the pattern portion 12. As a result, the pattern portion 12 is changed to be insoluble in a developing solution.

Figure 12A:
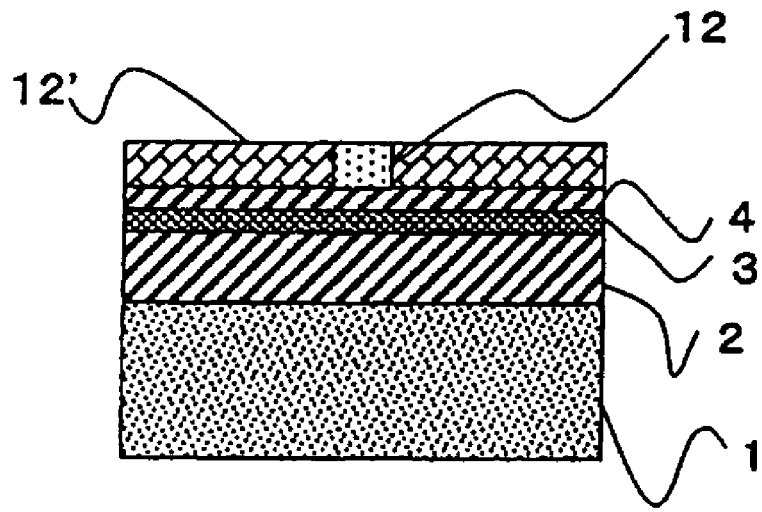
Figure 12B:
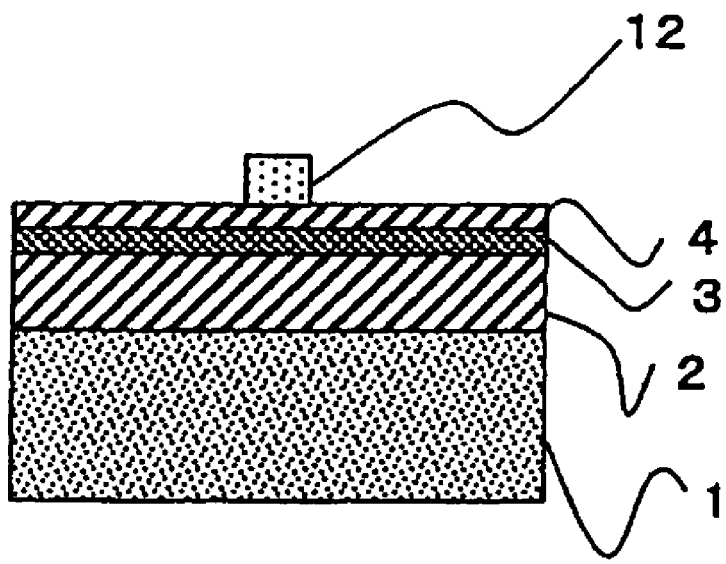

The processes illustrated in FIGS. 12A and 12B are the same as the processes illustrated in FIGS. 10B and 10C of the previous embodiment. In other words, the second thermal buffer layer 6, the second light-to-heat converting layer 7, and the cap layer 8 are removed, and the non-pattern portion 12' is removed through a developing process so that only the pattern portion 12 remains as a fine pattern.

As described above, a high aspect ratio fine pattern can be formed with a negative photoresist as well as a positive photoresist.

A more specific embodiment of the present invention is described below. The following embodiment is for illustrative purposes and is not intended to limit the scope of the invention.

<Embodiment 7>

A structure of pattern forming materials as illustrated in FIG. 3A was manufactured with a carbonate substrate having a thickness of 600 nm for the target substrate 1, a $ZnS.SiO_2$ layer having a thickness of 200 nm for the substrate protective layer 2, a $Ge_2Sb_2Te_5$ layer having a thickness of 15 nm for each of the first and second light-to-heat converting layers 3 and 7, a $ZnS.SiO_2$ layer having a thickness of 20 nm for each of the first and second thermal buffer layers 4 and 6, a $ZnS.SiO_2$ layer having a thickness of 20 nm for the cap layer 8, and a positive type photoresist layer (AZ5214-e, available from Clariant Corporation) having a thickness of 70 nm for the photo and/or thermal sensitive material layer 5. Next, the structure of the pattern forming materials was patterned using the method described in the above second embodiment.

In particular, the target substrate 1 having the pattern forming materials was loaded on a disc, and a laser beam having a wavelength of 635 nm was radiated onto the target substrate 1. An optical system having a numerical aperture of 0.6 and a diffraction limit of 530 nm was used. Due to the diffraction limit, a pattern finer than the diffraction limit cannot be formed when the optical system is used alone without heating.

The structure of the pattern forming materials was rotated at a rate of 6 m/s using an optical disc drive tester and irradiated with laser light at 3 mW during a single turn. Next, a line pattern was drawn by laser irradiation of 300 nm from a position closer to the structure of the pattern forming materials.

Figure 13:
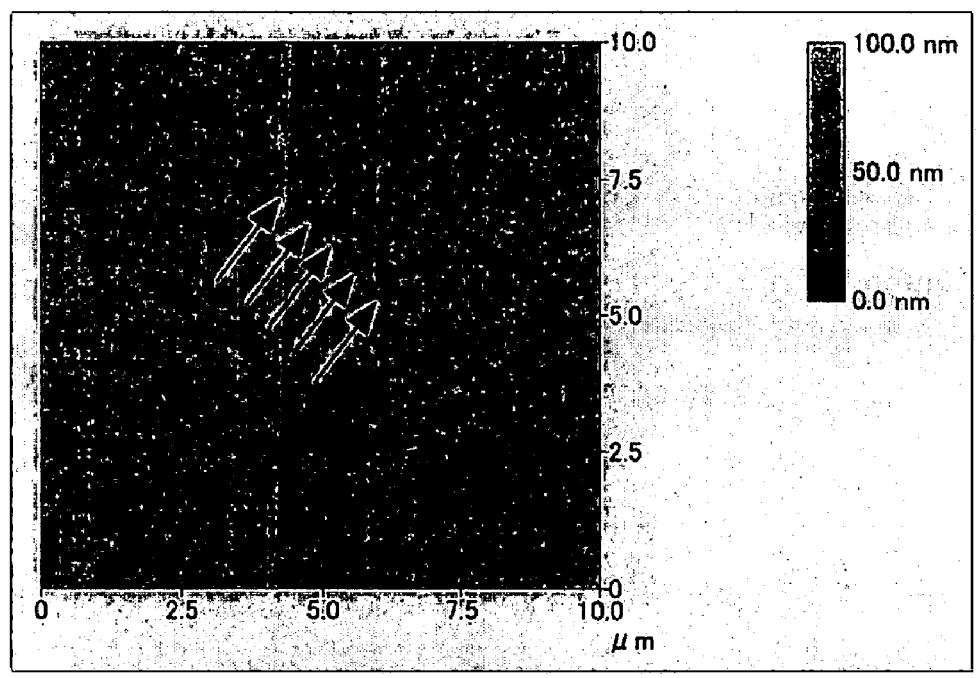
FIG. 13 illustrates the result of an atomic force microscopic observation on a fine pattern formed in another embodiment of the present invention.

A 1% hydrofluoric acid solution was used to remove the cap layer 8 and the second thermal buffer layer 6, and a 1:5 mixture of 10% potassium hydroxide solution and 35% hydrogen peroxide solution was used to remove the second light-to-heat converting layer 7. An organic alkaline solution (NMD-W, available from TOKYO OHKA KOGYO LTD.) was used as a developing solution, The resulting fine pattern was observed using an atomic force microscope. The result is shown in FIG. 13. In FIG. 13, the arrows denote the line pattern. As shown in FIG. 13, lines are arranged close together with a line width of 130 nm. The maximum height of a single line is 60 nm, which is almost the same as the thickness of the photoresist layer. In addition, the line pattern has a whole shape because there was no evaporation and deformation of the photoresist and has a higher aspect ratio than conventional patterns.

The optical system used in this embodiment, which emits visible laser light, is more economical than currently available photolithography which uses vacuum UV, X-rays, etc., to form a fine pattern.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, a photo and/or thermal sensitive material layer with light-to-heat converting layers on its upper and lower surfaces is deposited on a target substrate and subjected to activation light irradiation, so that a fine pattern can be efficiently formed in the photo and/or thermal sensitive material layer by heat generated via the activation light irradiation, without evaporation or deformation of the photo and/or thermal sensitive material layer. The resulting fine pattern has a higher aspect ratio compared to conventional patterns.

What is claimed is:

1. A pattern forming material comprising:
   a thermal sensitive material layer formed on a target substrate;
   a first light-to-heat converting layer formed between the thermal sensitive material layer and the target substrate; and
   a second light-to-heat converting layer formed on a surface of the thermal sensitive material layer opposite to the first light-to-heat converting layer,
   wherein the thermal sensitive material layer, which does not comprise a light-to-heat material, is interposed between the first and second light-to-heat converting layers and the first and second light-to-heat converting layers consists essentially of Ge—Sb—Te alloys; Ag—In—Sb—Te alloys; Ag—In—Sb—Te—V alloys; lithium niobate; methylnitro aniline; or any combinations thereof, and
   wherein the first and second light-to-heat converting layers absorb a first activation light radiated thereon and convert the absorbed activation light into heat.

2. The pattern forming material of claim 1, wherein the thermal sensitive material layer is rendered soluble or insoluble in a developing solution after being irradiated thereon by a second activation light which has a different wavelength or a same wavelength as a wavelength of the first activation light.

3. The pattern forming material of claim 2, wherein the thermal sensitive material layer, after heat is generated in the first and second light-to-heat converting layers by the irradiation of the first activation light, is no longer rendered photosensitive due to the exposure to the heat.

4. The pattern forming material of claim 2, wherein the thermal sensitive material layer is rendered insoluble in the developing solution by the heat generated in the first and second light-to-heat converting layers by the first activation light irradiation.

5. The pattern forming material of claim 3, wherein the thermal sensitive material layer is made of a positive type photoresist.

6. The pattern forming material of claim 4, wherein the thermal sensitive material layer is made of a negative type photoresist.

7. The pattern forming material of claim 1, further comprising at least one thermal protective layer between the second light-to-heat converting layer and the target substrate.

8. The pattern forming material of claim 7, wherein the thermal protective layer is a substrate protective layer formed between the first light-to-heat converting layer and the target substrate.

9. The pattern forming material of claim 7, wherein the thermal protective layer is a thermal buffer layer formed between the thermal sensitive material layer and the first light-to-heat converting layer.

10. The pattern forming material of claim 7, wherein the thermal protective layer is a thermal buffer layer formed between the second light-to-heat converting layer and the thermal sensitive material layer.

11. The pattern forming material of claim 1, further comprising a cap layer on the second light-to-heat converting layer.

12. A method of forming a pattern on a pattern forming material comprising a thermal sensitive material layer, which does not comprise a light-to-heat converting material, and which is interposed between first and second light-to-heat converting layers, the method comprising:
   radiating a light onto the first and the second light-to-heat converting layers to generate heat therein that changes a pattern portion of the thermal sensitive material layer,
   wherein the first and second light-to-heat converting layers consists essentially of Ge—Sb—Te alloys; Ag—In—Sb—Te alloys; Ag—In—Sb—Te—V alloys; lithium niobate; methylnitro aniline; or any combinations thereof.

13. A method of forming a pattern using a pattern forming material including a thermal sensitive material layer, which does not comprise a light-to-heat converting material, formed on a target substrate, a first light-to-heat converting layer formed between the thermal sensitive material layer and the target substrate, and a second light-to-heat converting layer formed on a surface of the thermal sensitive material layer opposite to the first light-to-heat converting layer, the thermal sensitive material layer being interposed between the first and second light-to-heat converting layers and the first and second light-to-heat converting layers consists essentially of Ge—Sb—Te alloys; Ag—In—Sb—Te alloys; Ag—In—Sb—Te—V alloys; lithium niobate; methylnitro aniline; or any combinations thereof, the method comprising:
   radiating a first activation light onto the first and second light-to-heat converting layers to generate heat therein and change a pattern portion of the thermal sensitive material layer; and
   removing a non-pattern portion of the thermal sensitive material layer.

14. The method of claim 13, further comprising radiating a second activation light onto the thermal sensitive material layer after the pattern portion has been changed.

15. The method of claim 13, further comprising radiating a third activation light onto the thermal sensitive material layer before radiating the first activation light.

16. The method of claim 13, wherein the thermal sensitive material layer is made of a positive type photoresist.

17. The method of claim 13, wherein the thermal sensitive material layer is made of a negative type photoresist.

18. The pattern forming material of claim 1, wherein the target substrate is thermally resistant.

19. The pattern forming material of claim 8, wherein the substrate protective layer is formed on the substrate.

20. The method of claim 13, wherein the thermal sensitive material layer changes properties due to heating or activation light irradiation, allowing a pattern to appear through a development process.

21. The method of claim 13, wherein at least two surfaces of the thermal sensitive material layer are heated, enabling a high aspect ratio pattern to be formed.

22. The method of claim 14, wherein the second activation light is blue light.

23. The method of claim 14, wherein the non-pattern portion of the thermal sensitive material layer is removed by a developing solution.

24. The pattern forming material of claim 1, wherein the thermal sensitive material layer formed on the target substrate.

* * * * *